United States Patent
Reynard-Carette et al.

(10) Patent No.: US 11,971,312 B2
(45) Date of Patent: Apr. 30, 2024

(54) MEASUREMENT CORE FOR MEASURING NUCLEAR HEATING IN A NUCLEAR REACTOR AND CALORIMETRIC SENSOR INCORPORATING SUCH A MEASUREMENT CORE

(71) Applicants: COMMISSARIAT A L'ENERGIE ATOMIQUE ET AUX ENERGIES ALTERNATIVES, Paris (FR); UNIVERSITE D'AIX MARSEILLE, Marseilles (FR); Centre national de la recherche scientifique, Paris (FR)

(72) Inventors: Christelle Reynard-Carette, Marseilles (FR); Adrien Volte, Marseilles (FR); Abdallah Lyoussi, Manosque (FR); Michel Carette, Marseilles (FR)

(73) Assignees: COMMISSARIAT A L'ENERGIE ATOMIQUE ET AUX ENERGIES ALTERNATIVES, Paris (FR); UNIVERSITE D'AIX-MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 158 days.

(21) Appl. No.: 17/549,762

(22) Filed: Dec. 13, 2021

(65) Prior Publication Data

US 2022/0196488 A1    Jun. 23, 2022

(30) Foreign Application Priority Data

Dec. 21, 2020   (FR) ........................................ 2013804

(51) Int. Cl.
*G01K 17/00*    (2006.01)
*G01K 7/02*    (2021.01)
(Continued)

(52) U.S. Cl.
CPC ................ *G01K 17/00* (2013.01); *G01K 7/02* (2013.01); *G01K 7/16* (2013.01); *G01K 17/006* (2013.01); *G21C 17/00* (2013.01); *G21C 17/112* (2013.01)

(58) Field of Classification Search
CPC ..... G01K 17/006; G21C 17/10; G21C 17/112
See application file for complete search history.

(56) References Cited

U.S. PATENT DOCUMENTS

2005/0254552 A1    11/2005   Bruce et al.
2007/0148416 A1    6/2007   Wolkin et al.
(Continued)

FOREIGN PATENT DOCUMENTS

CN    100538920 C  *  9/2009   ............. G01F 1/692
EP    1962070 A2  *  8/2008   ............... G01K 1/12
(Continued)

OTHER PUBLICATIONS

Translation of EP1962070A2 (Year: 2008).*
Anonymous: "Thermistance—Wikipedia", Sep. 1, 2020. Internet: https://fr.wikipedia.org/w/index.php?title=Thermistance&oldid=174616228.

*Primary Examiner* — Mirellys Jagan
(74) *Attorney, Agent, or Firm* — BakerHostetler

(57) ABSTRACT

A measurement core for measuring nuclear heating, the core extending in a longitudinal direction and having a main plane, includes at least: a first layer of material, forming a first sample; a first thin layer of electrical insulation on the first sample; a thin conductive layer forming a heating electrical resistor on the first layer of electrical insulation; and a second thin layer of electrical insulation on the heating electrical resistor. A calorimetric sensor includes: an outer jacket; a gas contained in the jacket; a measurement core disposed in the jacket; a link for holding the core in the jacket and transferring the heat between the core and the
(Continued)

jacket; and temperature measurement capable of measuring the temperature at a hot point, and the temperature at a cold point.

23 Claims, 4 Drawing Sheets

(51) Int. Cl.
*G01K 7/16* (2006.01)
*G21C 17/00* (2006.01)
*G21C 17/112* (2006.01)

(56) References Cited

U.S. PATENT DOCUMENTS

2017/0358374 A1* 12/2017 Loewen ................ G21C 17/032
2020/0271528 A1* 8/2020 Wienand .................. H01B 3/12

FOREIGN PATENT DOCUMENTS

| FR | 2 968 448 A1 | 6/2012 |
| FR | 3 034 867 A1 | 10/2016 |
| KR | 101 879 343 B1 | 8/2018 |

* cited by examiner

MEASUREMENT CORE FOR MEASURING NUCLEAR HEATING IN A NUCLEAR REACTOR AND CALORIMETRIC SENSOR INCORPORATING SUCH A MEASUREMENT CORE

CROSS-REFERENCE TO RELATED APPLICATIONS

This application claims priority to foreign French patent application No. FR 2013804, filed on Dec. 21, 2020, the disclosure of which is incorporated by reference in its entirety.

FIELD OF THE INVENTION

The invention relates to the field of measurement and instrumentation for nuclear reactors and, more particularly, the field of measuring nuclear heating or even energies deposited by radiations in the material (doses and dose rates absorbed by the different materials).

The invention relates specifically to a measurement core and a calorimetric sensor comprising such a measurement core, this for measuring nuclear heating, in a nuclear reactor.

BACKGROUND

Nuclear heating is induced notably by the photon and neutron radiations which exist in a nuclear reactor.

Nuclear heating is the term used for the deposition of energy per unit of mass and of time ($J \cdot s^{-1} \cdot g^{-1}$ or W/g) induced by the interactions of the radiations with the material.

The neutron radiations can be quantified using specific systems such as fission chambers, collectrons or even activation detectors. The photon radiations can, for their part, be quantified using specific systems such as ionization chambers or collectrons. The photon and neutron radiations, through their absence of charges and mean free paths in the material, have the property of depositing their energy in the material (in materials) even "far away" from the place of generation of these radiations (in-core experimental channels, reflectors, etc.), and of consequently heating said materials.

Materials are understood to be the materials contained in the nuclear reactor, for example the structures of the reactor, the experimental devices, including all the materials present in the reactor core (including the nuclear fuels).

Quantifying the overall nuclear heating produced by the radiations, rather than the particle flows, is recommended in order to determine the effect of these radiations.

This is particularly suited to a nuclear reactor of experimental type in which the structures and the internal systems (experimental devices for example) differ according to the experimental channels and according to the experimental programmes. It is all the more necessary to measure the nuclear heating in a nuclear reactor of experimental type since this is a key quantity for dimensioning the experimental devices, notably from the point of view of their mechanical strength, and their thermal resistance.

Nuclear heating is measured conventionally by a calorimetric method, by using a calorimeter. A calorimetric method consists essentially in determining the nuclear heating of a small element of material, that can also be called sample or core, the weight of which is known, by measuring the variation of temperature or temperatures or a difference in temperature or temperatures.

Hereinafter in the description, this small material element will be called "sample". The sample is usually made of graphite or of metal.

The variation of temperature or temperatures or the difference in temperature or temperatures can be due to the effects of the photon and neutron radiations. It can also be due to a heating system incorporated in the calorimeter, combined or not with the radiations, for example for calibrating the calorimeter outside of the reactor or in the reactor, or for implementing an in-reactor so-called "zero" measurement protocol or an in-reactor so-called "current addition" measurement protocol. Such measurement protocols are described in the patent FR 2 968 448.

A different calorimeter is commonly used with two specimens. A differential calorimeter is of non-adiabatic type in as much as there are heat exchangers between the calorimeter and the heat-transfer fluid outside the calorimeter.

The abovementioned patent FR 2 968 448 describes a differential calorimeter comprising a calorimetric cell with two specimens, essentially identical, superposed on top of one another on a main axis, a first specimen being solid, that is to say comprising a sample of material in which the deposition of energy must be measured, and a second specimen being empty and serving as reference. Each specimen is linked to a base in the main axis via a link cylinder, and two thermocouples per specimen are disposed, one at the top of the link cylinder and the other at the base level. The temperature difference between the two thermocouples is measured. The nuclear heating measurement is based on a dual temperature difference between the two specimens. The deposition energy is deduced from this dual temperature difference between the two specimens, and is expressed in W/g.

In order to overcome the absence of juxtaposition of the specimens in such a configuration, the patent FR 2 968 448 imposes on the calorimetric cell a displacement along the main axis with measurements of temperature differences for each specimen at each axial position, the displacement being associated with a suitable synchronization of the measurements.

In order to make it possible to perform nuclear heating measurements by prioritizing radical heat exchanges, the patent FR 3 034 867 develops and describes a calorimetric cell with at least one specimen which comprises: a body configured to contain a sample, sensitive to the heat, along a longitudinal axis and means for discharging the heat from the body out of the specimen comprising a peripheral structure situated at the periphery of the body and a central mechanical link structure disposed radially between the body and the peripheral structure to transfer the heat radially. The calorimetric cell further comprises two thermocouples per specimen: one at the body/central structure interface and the other at the central structure/peripheral structure interface. The calorimetric cell generally comprises two specimens with a wholly-encapsulated outer jacket.

One drawback with the calorimetric cells described, whether they be with one specimen or with two specimens for a differential calorimeter, is that these cells are composed of several elements forming a structure whose weight and dimensions effect its physical behaviour, and notably induce heatings of the structure itself, increasing the absolute temperatures reached inside the calorimeter, even though only the heating of the sample is sought. This drawback notably explains the need to perform differential measurements, with two specimens, in order to correct the biases induced by the parasitic depositions of energy notably on the structure itself, and thus identify the heating of the single sample and trace the dose rate absorbed by said sample. Now, the use of two specimens instead of just one increases the weight and the dimensions of the calorimetric cell. This drawback means, as described in the patent FR 2 968 448, having to displace the two specimens to perform a measurement on a specific side, which greatly increases the complexity of the measurement and extends the measurement time.

Furthermore, since the height for a single calorimetric cell (a single specimen) can reach several centimetres and, for a differential calorimetric cell (two specimens) the height can reach several tens of centimetres, that limits the incorporation of the calorimeters in the experimental channels of the reactors given the space available in said channels. That also limits their coupling with other sensors in multi-sensor devices for measurements in said channels. That also prevents the incorporation of the calorimeters in certain irradiation devices.

Furthermore, the size of the samples (a few centimetres) of the known calorimeters does not allow a local measurement over a few millimetres.

Finally, the weight and the dimensions of the calorimeters (notably differential calorimeters) induce significant response times that have an impact on the duration of the measurement (it is in fact necessary to wait for a steady state to be established), and on the maximum temperature reached in the calorimeter.

SUMMARY OF THE INVENTION

The invention aims to overcome the abovementioned drawbacks of the prior art.

More specifically, the invention aims to have a calorimetric cell, hereinafter designated "calorimetric sensor" which is suitable for measuring nuclear heating in a nuclear reactor, and whose size and weight are reduced compared to the known calorimetric cells, so as to reduce the bulk, and in which the size of the sample contained in the sensor is reduced so as to enhance the spatial resolution of the measurement.

The invention aims also to limit the parasitic heating in the structure of the calorimetric cell, and do so without necessarily having to perform a displacement of said sensor for the measurement of the nuclear heating on a given side and/or perform a differential measurement with two specimens.

A calorimetric sensor is advantageously sought that is miniaturized with short response time and that does not require a displacement for the measurement of the nuclear heating on a given side, so as to reduce the measurement time (from several tens of minutes to a few minutes, or even to a few tens of seconds depending on the configuration of the sensor). A calorimetric sensor in which the number of cables is reduced is particularly sought.

The first subject of the invention that makes it possible to remedy these drawbacks is a calorimetric measurement core for measuring nuclear heating in a nuclear reactor, said measurement core extending in a longitudinal direction and having a main plane, and comprising at least:
  a first layer of material, forming a first sample;
  a first thin layer of electrical insulation disposed on the first sample;
  a thin conductive layer forming a heating electrical resistor disposed on the first layer of electrical insulation;
  a second thin layer of electrical insulation disposed on the heating electrical resistor;
the first thin layer of insulation having dimensions in the main plane matched to those of the first sample;
the thin layers of electrical insulation being configured to insulate the heating resistor from the sample and/or protect said heating resistor; and
the first sample preferably having dimensions less than or equal to around fifteen, even around ten, millimetres in the main plane, and/or a thickness less than or equal to 10 millimetres, even more preferentially less than or equal to 2 millimetres.

A layer of material forms a sample for which the quantification of the nuclear heating is sought. In other words, the quantification of the nuclear heating is sought only for the sample or samples.

A "thin" layer is understood to be a layer whose thickness is less than or equal to 10 µm.

According to the configurations of the measurement core according to the invention, the dimensions in the plane target the length, the width and/or the diameter and correspond to the dimensions with respect to the main plane of the measurement core. The thickness and the depth designate the dimension in a direction at right angles to the main plane. The terms "upper" or "lower" should be understood with reference to the longitudinal direction of the measurement core and of the calorimetric sensor when they are disposed vertically, bearing in mind that they can be disposed horizontally or obliquely.

The invention makes it possible, by using layers of reduced thickness and dimensions in the plane, to reduce the size and the weight of the measurement core and of the calorimetric sensor. That makes it possible to have a more localized measurement, a better spatial resolution, while not requiring displacement of the calorimetric sensor for a measurement on a given side. That also allows for a reduction of the response time, which, coupled with the absence of displacement, leads to shorter measurement times. Furthermore, that allows for a reduction of the total weight reducing the parasitic heatings of the structure and therefore the maximum temperatures reached. Furthermore, the invention makes it possible to reduce the number of electrical connection cables, because of the use of a single specimen (that is to say a single measurement core).

Furthermore, the calorimetric sensor, because of its reduced size, makes it possible to have several calorimetric sensors in a measurement channel in a nuclear reactor, possibly with samples of different natures depending on the sensors, even to couple it with other sensors, such as radiation detectors (ionization chambers, fission chambers, collectrons, etc.).

The calorimetric measurement core according to the invention can further comprise one or more of the following features taken alone or in all technically possible combinations.

According to one embodiment, the measurement core further comprises:
  a second layer of material, forming a second sample; the second thin layer of electrical insulation being between the heating resistor and the second sample;
  the second thin layer of electrical insulation having dimensions in the main plane matched to those of the second sample;
  the second layer of electrical insulation being configured to insulate the heating resistor from the second sample;
  the second sample preferably having dimensions less than or equal to around fifteen, even around ten, millimetres in the main plane, and/or a thickness less than or equal to 10 millimetres, even more preferentially less than or equal to 2 millimetres. That allows for an overall symmetry, the heating element being located at the centre of an assembly composed of two samples and of two thin layers of electrical insulation, and a better thermal uniformity in the sample.

According to a particular embodiment, the first sample has a length, respectively a diameter, greater than the length, respectively the diameter, of the second sample. The first sample can notably be adapted to be able to receive all the surface of the heating resistor and its connections, while the second sample can be adapted to cover the heating resistor apart from its connections.

According to one embodiment, the heating resistor comprises a track made of a conductive material in coil, spiral or meander form, or any other form suited to the form of the samples.

According to one embodiment, the heating resistor is made of platinum, of a nickel-chromium alloy, of constantan, or any other material suitable for forming a heating resistor.

According to one embodiment, the thin layers of electrical insulation are made of silicon oxide, of alumina, of silicon nitride, or of magnesium oxide.

According to one embodiment, the sample or samples are made of graphite, of stainless steel, of aluminium or of titanium.

According to one embodiment, the sample or samples have a surface texture suitable for the deposition of at least one thin layer of electrical insulation by a thin layer deposition technique, for example a mirror-polished surface texture. That makes it possible to enhance the adhesion of the thin layers of the heating element to the sample or samples.

According to one embodiment, the measurement core further comprises at least one adhesion layer between the heating resistor and at least one thin layer of electrical insulation and/or between at least one sample and at least one thin layer of electrical insulation. An adhesion layer allows for a better bond between two layers.

According to one embodiment, the measurement core further comprises at least one functional layer, that can be a layer of boron, of cadmium, of silicon carbide (SiC) and/or of lithium, said functional layer being able to be deposited on the outer face of at least one sample. It can for example have a thickness of the same order as the other thin layers. Such a functional layer can make it possible to: generate selective specific interactions, and/or convert particles/radiations, and/or amplify the nuclear heating.

According to one embodiment, the first sample, and if appropriate the second sample, is of parallelepipedal form, forming a parallelepipedal core.

According to an alternative embodiment, the first sample, and if appropriate the second sample, is of semicylindrical form forming a semicylindrical or cylindrical core, the cylinder length extending in the longitudinal direction.

According to another alternative embodiment, the first sample, and if appropriate the second sample, is of disc form, the disc diameter extending in the longitudinal direction.

According to one embodiment, at least one sample is holed in at least one upper and/or lower portion, so as to form at least two upper lugs and/or at least two lower lugs.

According to a particular embodiment, the upper lugs are dimensioned to accommodate the connection elements of the heating resistor, the upper lugs having, for example, a width greater than the lower lugs.

According to a particular embodiment, the heating resistor is configured to form a resistive temperature probe, so as to measure the temperature in a zone comprising a temperature measurement hot point, said heating resistor being then linked to a measurement means of the resistor, preferably by a four-wire circuit.

A second subject of the invention is a calorimetric sensor for measuring nuclear heating in a nuclear reactor, said sensor comprising:

a fluid-tight outer jacket;

a gas contained in the outer jacket;

a measurement core according to the first subject of the invention, said core being disposed in the outer jacket;

link means capable of holding the measurement core in the outer jacket and of transferring the heat between said core and said jacket;

temperature measurement means, comprising a first temperature measurement means capable of measuring the temperature at a hot point, preferably as close as possible to the heating element of the measurement core, and a second temperature measurement means capable of measuring the temperature at a cold point, preferably on a wall of the jacket.

According to one embodiment, the temperature measurement means comprise at least one thermocouple, preferably a wired microthermocouple or a thin-film microthermocouple.

According to one embodiment, the first temperature measurement means is formed by the heating resistor.

According to one embodiment, the link means comprise spacers that can have different forms and materials.

According to one embodiment, at least one sample is holed in at least an upper and/or lower portion, so as to form at least two upper lugs and/or at least two lower lugs, the link means being wholly or partly formed by said lugs.

According to one embodiment, the jacket is made of aluminium, of stainless steel or of titanium.

The calorimetric measurement core and the calorimetric sensor according to the invention can comprise any one of the features stated above, taken alone or according to all technically possible combinations with other features.

BRIEF DESCRIPTION OF THE DRAWINGS

Other features, details and advantages of the invention will emerge on reading the description given with reference to the attached figures which are given by way of example.

Throughout these figures, identical references can designate identical or similar elements.

Furthermore, the various parts represented in the figures are not necessarily represented according to a uniform scale, to render the figures more legible.

DETAILED DESCRIPTION

FIGS. 1A to 1D, 2, 3, 4 and 5 represent several embodiments of a measurement core according to the invention, and that can be assembled in a calorimetric sensor. The direction X corresponds to the longitudinal direction of the measurement core and of the sensor, the direction Y to the transverse direction and XY corresponds to the main plane of the measurement core. The direction Z is the direction orthogonal to the main plane.

First Embodiment (Measurement Core)

Figure 1A:
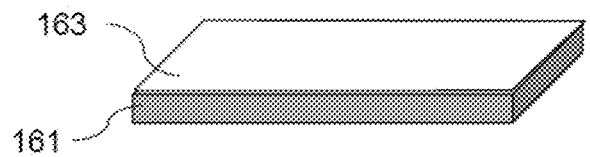
FIGS. 1A-1D represent a measurement core according to a first embodiment of the invention represented in an exploded view and horizontally.
Figure 1B:
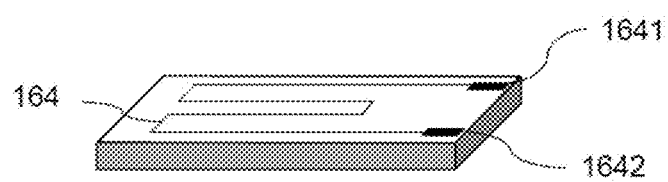
Figure 1C:
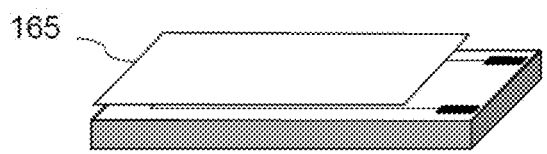
Figure 1D:
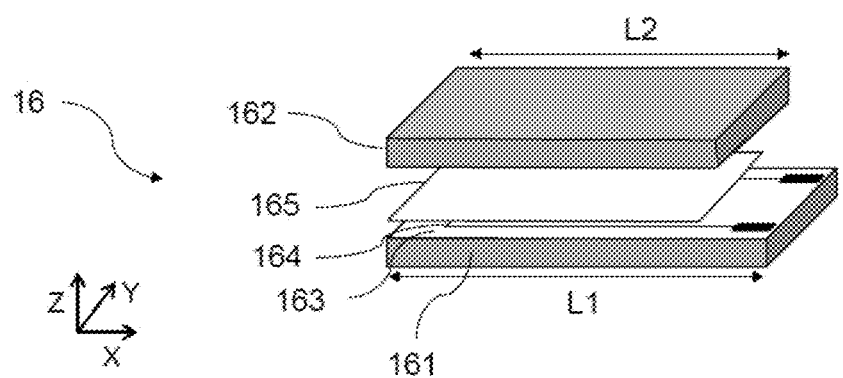
Figure 2:
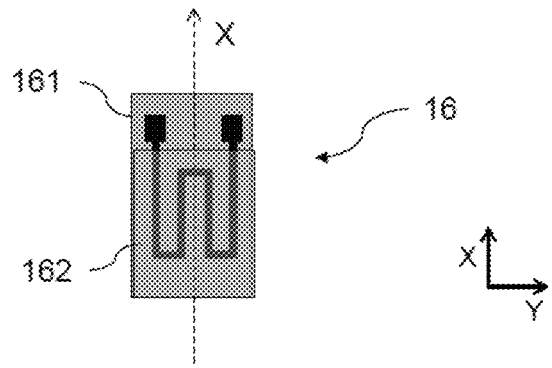
FIG. 2 represents the measurement core according to the first embodiment of the invention represented by a front view and vertically.
Figure 6A:
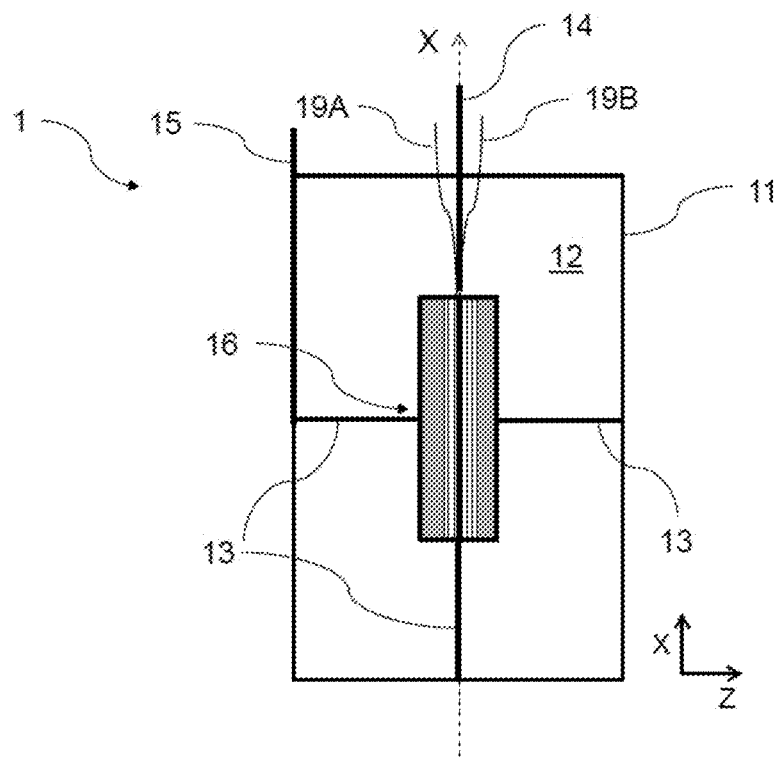
FIGS. 6A-6B represent a calorimetric sensor according to a first embodiment.
Figure 6B:
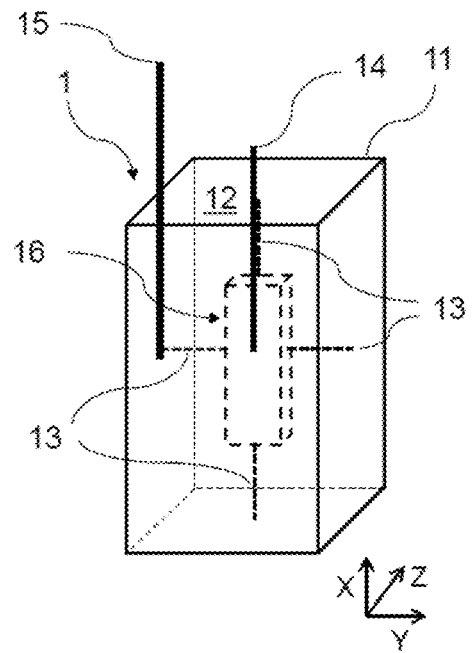

FIGS. 1A to 1D illustrate a measurement core 16 according to a first embodiment, represented by an exploded view, and according to the various steps of assembly of the various elements of said measurement core. The longitudinal direction X of the measurement core represented is oriented horizontally, although it can be disposed vertically, as represented in FIG. 2, and notably vertically in the calorimetric sensor as represented in FIGS. 6A and 6B.

The measurement core 16, of parallelepipedal form, comprises, in order of stacking:
- a first layer of material forming a first sample 161 in which the quantification of the nuclear heating is sought;
- a first thin layer of electrical insulation 163;
- a heating electrical resistor 164 (thin conductive layer);
- a second thin layer of electrical insulation 165;
- a second layer of material forming a second sample 162 in which the quantification of the nuclear heating is sought.

The assembly of heating resistor and thin layers of insulation forms a heating element, the heating resistor being sandwiched between the two thin layers of insulation.

The layers constituting the measurement core are of parallelepipedal form, apart from the resistor which has a particular form, described hereinbelow. The layers are stacked one on top of the other.

A sample is an element of material of known weight, for which the nuclear heating is sought to be measured. The material of a sample can notably be graphite, stainless steel, aluminium or titanium. The width and the length of a sample vary between a few millimetres and around 15 millimetres, even around 10 millimetres. The thickness of a sample is of the order of 1 to 2 millimetres, a minimum thickness being required in order to have significant deposits of energy. In this embodiment, the two samples have substantially the same dimensions apart from their lengths L1, L2.

The first sample 161 has a length L1 greater than the length L2 of the second sample 162 to be able to receive all the surface of the heating resistor 164 and its connections, represented in the form of two pads 1641 and 1642, while the second sample has a length L2 that is reduced so as to cover the heating resistor apart from the connections.

As an example, the first and second samples can have the following respective dimensions (length×width×thickness):
- 13 mm×10 mm×1 mm (first sample 161) and 10 mm×10 mm×1 mm (second sample 162); or
- 7 mm×4 mm×1 mm (first sample 161) and 4 mm×4 mm×1 mm (second sample 162).

Moreover, the first insulating layer 163 also has a length greater than that of the second insulating layer 165. Each layer of insulation is disposed between the heating resistor and one of the samples, in order to electrically insulate said heating resistor (conductive layer) from the samples. Each layer of insulation must therefore have dimensions that are sufficient in the plane to electrically insulate the heating resistor from each sample, but also to be able to be deposited on said sample. In other words, the dimensions in the plane of a layer of insulation must also be matched to those of the sample with which they are directly in contact. The thickness of an insulating layer lies between approximately 100 mm and a few μm. An insulating layer can notably be made of silicon oxide, of alumina, of silicon nitride, of magnesium oxide. Alumina α is particularly advantageous because of its very high melting point.

The surface texture of the samples is an important element since it conditions the adhesion of the thin layers of the heating element on said samples. Preferably, the samples have a mirror polished surface texture. To produce a suitable surface texture, the samples can undergo a preparation step prior to the deposition of the thin layers, that can consist of a cleaning of a few minutes in an ultrasound bath with acetone, then ethanol and finally distilled water. This preparation of the samples makes it possible to improve the interfaces between the thin layers and the samples and thus improve the physicochemical properties of the whole.

The heating resistor comprises a track made of a conductive material, for example in coil form. The conductive material can notably be platinum, a nickel-chromium alloy, or another alloy (such as constantan). The thickness of the heating resistor lies between approximately a few tens of nm and a few μm. The width of the track is less than or equal to 0.5 mm. As a set, the characteristics of the track (form, thickness, width, length) depend on the desired resistance value.

Alternatively, the heating resistor can be of spiral form, notably of circular spiral form, or any other form suitable for forming a resistor, notably by meanders and suited to the form of the samples.

Together, the heating resistor and layers of insulation form a heating element which is manufactured at the same time as the measurement core.

The heating element can be manufactured by one of the known microelectronics techniques. The heating resistor can notably be produced by a lift-off photolithography technique coupled with a thin film deposition technique (notably cathodic sputtering) to obtain the desired form, for example coil or spiral. The thin insulating layers can be deposited by a thin film deposition technique (notably cathode sputtering or vacuum deposition).

The heating element makes it possible to calibrate the calorimetric sensor prior to integration in a nuclear reactor (outside of an irradiated environment). It notably makes it possible to locally simulate the nuclear heating by Joule's effect. The heating element can also make it possible to calibrate the calorimetric sensor after integration in a nuclear reactor (in an irradiated environment) and to apply so-called "zero" or "current addition" measurement methods for which it is necessary to provide energy in addition to the energy deposited by radiation/material interaction (measurement methods whose principles are described in the patent FR 2 968 448 but which are suitable, as is known to the person skilled in the art, for the measurement core according to the invention).

Variant Embodiment

According to a variant embodiment, the heating element, in particular the heating resistor, can make it possible to form a temperature sensor, more specifically a temperature resistive probe, to measure the temperature in the zone of the hot point. In this case, the heating resistor is a resistor sensitive to temperature R(T), and the temperature can be given by the following law (linear approximation):

$$R(T)=R(T_0)\times(1+\alpha(T-T_0))=R(T_0)+R(T_0)\times\alpha(T-T_0) \quad [\text{Math.1}]$$

in which $\alpha$ is the temperature coefficient of the conductive material of the resistor.

By measuring the resistance R(T) and by knowing the initial resistance $R(T_0)$ given for an initial temperature $T_0$, the temperature difference $\Delta T$ corresponding to $T-T_0$ is deduced therefrom.

It should be noted that the initial resistance can be expressed by the formula:

$$R(T_0)=\rho(T_0)\times\frac{L(T_0)}{S(T_0)} \quad [\text{Math. 2}]$$

In which L is the overall length of the track of the heating resistor and S is its section, and in which $\rho$ is the resistivity of the conductive material of the heating resistor, given at the initial temperature $T_0$.

In this case, said heating resistor should be linked to a resistance measurement means, preferably by a 4-wire circuit, which is a more precise circuit than a 2 or 3-wire circuit known for measuring a resistance. $R(T_0)$ can be measured in the same way.

FIG. 2 represents the measurement core 16 according to the first embodiment of the invention, represented by a front view and vertically, as it is generally oriented in the sensor.

Second Embodiment (Measurement Core)

Figure 3:
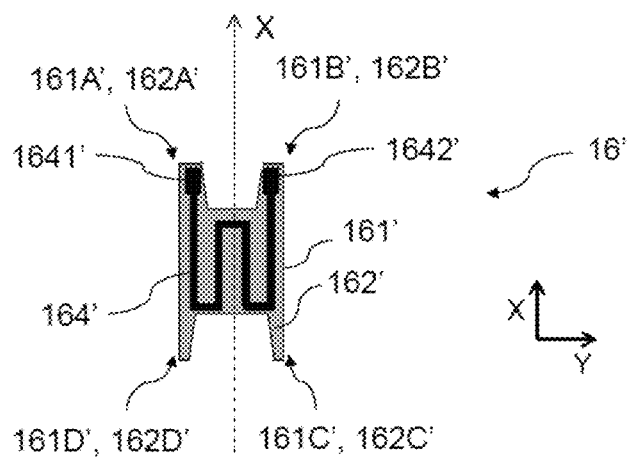
FIG. 3 represents a measurement core according to a second embodiment of the invention represented by a front view.

FIG. 3 represents a measurement core 16' according to a second embodiment of the invention represented by a front view. The measurement core 16' of this second embodiment differs from that of the first embodiment in that the samples 161', 162' have the same lengths but they have a form that is holed in the upper and lower portions. That makes it possible to form four lugs per sample (two upper lugs 161A', 161B', 162A', 162B' and two lower lugs 161C', 161D', 162C', 162D') at the four corners of each sample. The upper lugs 161A', 161B', 162A', 162B' are wider than the lower lugs, so as to accommodate the connection pads 1641' and 1642' of the heating resistor 164'.

Furthermore, these lower and upper lugs can be placed in contact with the jacket of the calorimetric sensor, as described below. Thus, as will be explained later, that makes it possible to replace all or some of the spacers necessary to the assembly of the measurement core in the calorimetric sensor. That notably makes it possible to facilitate the assembly and eliminate the added spacers. That makes it possible to reduce the parasitic heatings notably due to spacers machined from a material different from the sample. In the example represented, the two upper or lower portions are holed. Alternatively, only an upper portion or a lower portion of one or two samples may be holed.

The orders of magnitude of the dimensions of the samples given for the first embodiment are still valid: the width and the length of a sample vary between a few millimetres and around fifteen or even around ten millimetres, and the thickness is between one and two millimetres.

Furthermore, the first and second insulating layers (not represented because they are concealed by samples) have dimensions and forms matched to the dimensions of the first and second samples 161', 162' (they are also holed) and they must still have sufficient dimensions in the plane to insulate the resistor and protect it. The dimensions of said thin layers of insulation and of said heating resistor are of the same order of magnitude as for the first embodiment.

In both the embodiments described above and represented, the samples and therefore the measurement cores have a parallelepipedal form (holed or not). Such a form makes it possible to simplify the assembly of the different layers of the measurement core. That also makes it possible to more easily use certain thin-film deposition techniques to manufacture the heating element, notably by manufacturing it directly on a sample.

Third Embodiment (Measurement Core)

Figure 4:
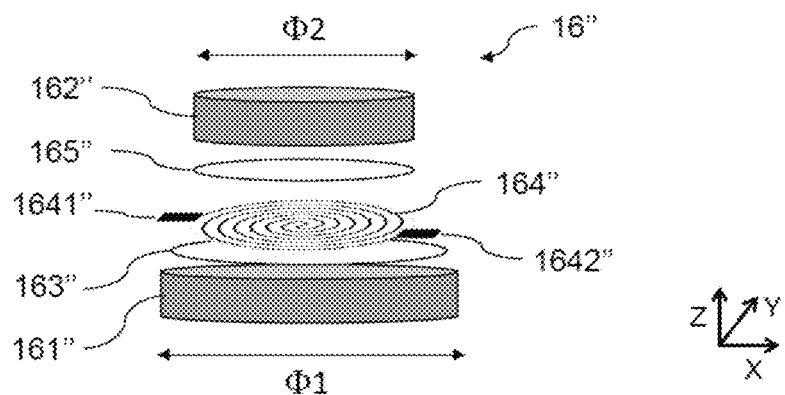
FIG. 4 represents a measurement core according to a third embodiment of the invention represented by an exploded view and horizontally.

Alternatively, the samples 161", 162" and therefore the measurement core 16" can have a disc form, as represented in FIG. 4. The longitudinal dimension then corresponds to the diameter of the samples.

In this case, the heating resistor 164" has a circular spiral form, with two electrical connection pads 1641", 1642" which can be diametrically opposed, as represented (not limiting). The two discs forming the two samples 161", 162" then have different diameters $\Phi 1$, $\Phi 2$ to accommodate the connection pads of the heating resistor.

The thin layers 163", 165" are also of circular disc form, their diameters being matched to that of the sample with which they are directly in contact.

The orders of magnitude of the dimensions of the samples given for the first embodiment are still valid: the diameter of a sample varies between a few millimetres and around fifteen or even around ten millimetres, and the thickness is between one and two millimetres.

Fourth Embodiment (Measurement Core)

Figure 5:
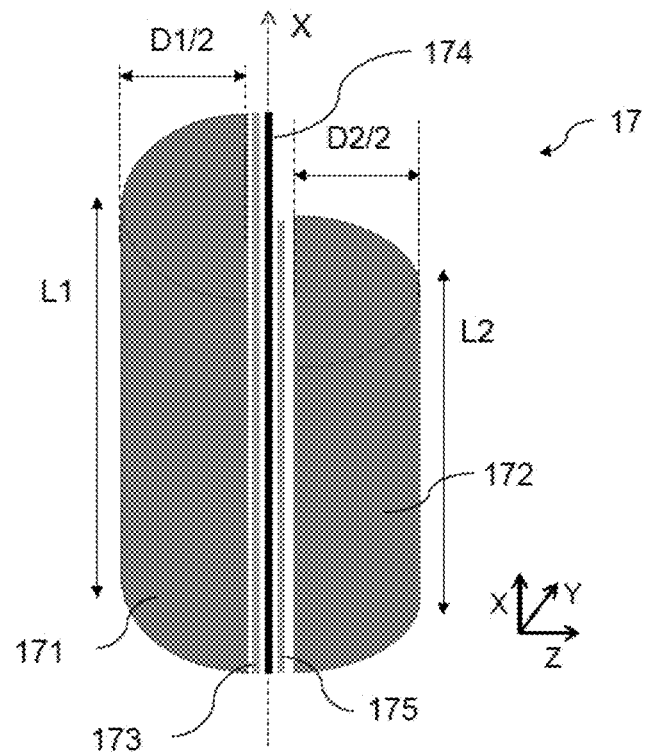
FIG. 5 represents a measurement core according to a fourth embodiment of the invention represented by an exploded view and vertically.

Alternatively, the measurement core can be of cylindrical form (even semicylindrical), the longitudinal direction corresponding to the length of said cylinder, a form more suited to most of the measurement channels in a nuclear reactor. This is illustrated in FIG. 5 representing a fourth embodiment of a measurement core 17 according to the invention.

In this embodiment, the two samples are of semicylindrical form, that is to say they are cylinders cut in two longitudinally, each half-cylinder then having a flat surface, corresponding to the main plane XY, on which the heating element can be deposited, that is to say the heating resistor sandwiched between the two thin insulating layers. The flat surfaces of the half-cylinders are assembled with this heating element which is then sandwiched between the two half-cylinders, so as to form a cylindrical measurement core.

In the fourth embodiment, the two samples 171, 172 have the same diameter but different lengths. The longitudinal direction of each semicylindrical sample corresponds to the length of said sample, and that is a cylinder cut in two in this longitudinal direction.

The length (L1, L2) of a sample varies between a few millimetres and around fifteen millimetres or even around ten millimetres. The maximum width, given by the diameter (D1, D2), varies between a few millimetres and around ten millimetres. The maximum thickness of a sample given by the radius (D1/2, D2/2) is a few millimetres.

As an example, the first and second samples can have the following respective dimensions: diameter (D1) of 4 mm×length (L1) of 7 mm and diameter (D2) of 4 mm×length (L2) of 4 mm.

The dimensions of the thin layers of insulation (173, 175) and of the heating resistor (174) are of the same order of magnitude as for the other embodiments. Given that the heating element is disposed on the flat surface XY, it can be of rectangular form.

Generally, the form of the measurement core is conditioned by the form of the samples, and by the number of samples. For example, if there is only a single semicylindrical sample, then the form of the measurement core is also semicylindrical.

In all the embodiments represented, it can be seen that the set of layers makes it possible to form a measurement core whose thickness is at most a few millimetres, which makes it possible to reduce the thickness of the calorimetric sensor. Moreover, the dimensions in the plane of the measurement core (length, width, and/or diameter) are of the order of a centimetre. Furthermore, the layers of the heating element are thin layers which are negligible in terms of weight and thickness with respect to the samples which are, for their part, dimensioned to allow the radiation/material interactions and the quantification of the nuclear heating, and for that need to have at least a minimal thickness.

FIGS. 1A to 1D, 2, 3, 4 and 5 represent measurement cores comprising two samples, it being understood that a single sample may be sufficient.

In fact, it may be sufficient or even advantageous to have only one sample, for example in one or more of the following cases:
- when the sample has a high density and a high atomic number, high enough to have significant depositions of energy and measure the nuclear heating; and/or
- when it is difficult to obtain two samples of small thicknesses associated with a suitable surface texture (surface sufficiently polished) to deposit the thin layers by one of the microelectronics techniques; and/or
- when it is wanted to simplify the mounting of the measurement core; and/or to avoid forming a thermal contact resistance by the assembly of two samples; and/or
- to reduce the weight of the measurement core, and thus notably increase the measurement range.

When there is only a single sample, the embodiments above and the manufacturing methods apply, except that the second layer of material forming the second sample is not present. The heating electrical resistor is sandwiched between the two thin layers of insulation in order, on one side, to insulate it from the sample and, on the other side, protect it.

Conversely, a measurement core with two samples offers the following advantages:
- an overall symmetry: in effect, the heating element is located at the centre of an assembly composed of two samples and of two thin layers of electrical insulation;
- a better thermal uniformity in the sample.

The two samples are made of the same material. They preferably have the same forms and the same dimensions, except the length or the diameter which can be different. They also have the same surface textures.

It is possible to act on the forms and the dimensions of the sample or samples in order to control the sensitivity of the sensor, instead of or in addition to the action on the form or the dimensions of the calorimetric sensor and/or on the nature of the gas and/or the size of the gas blades in the sensor.

In all the embodiments represented, and more generally in the context of the invention, complementary layers can be added in the measurement core.

Thin Adhesion Layer:

A thin adhesion layer can be provided between the heating resistor and at least one thin layer of insulation (the layer of insulation on which the resistor is deposited). The function of an adhesion layer is for a better bonding of the heating resistor on the layer of insulation. The thickness of an adhesion layer must be very small (a few nanometres) so as not to disrupt the assembly. This adhesion layer must have the same form as the heating element. Furthermore, depending on the nature of the materials and the deposition conditions, another adhesion layer may be deposited between the sample or samples and one or more thin layers of insulation, for a better bonding of one or more of the thin layers of insulation on the sample or samples. An adhesion layer can for example be a layer of titanium or a layer of tantalum.

Functional Layer:

At least one functional layer can be added to the measurement core. That can be a layer of boron, of cadmium, of silicon carbide (SiC) and/or of lithium. A functional layer has dimensions smaller than those of the samples, and can be affixed onto a sample (for example on its outer face). It can for example have a thickness of the same order as the other thin layers. Such a functional layer can make it possible to: generate selective specific interactions, and/or convert particles/radiations, and/or amplify the nuclear heating.

First Embodiment (Calorimetric Sensor)

FIGS. 6A (longitudinal cross-sectional view) and 6B (3D view) illustrate a calorimetric sensor according to a first embodiment. The latter is represented with a measurement core configured according to the first embodiment, but it could comprise a measurement core according to one of the other embodiments or any other measurement core falling within the scope of the invention.

To form a calorimetric sensor, the measurement core is incorporated in a jacket containing gas, and it is held centred in said jacket by using several spacers which also make it possible to transfer the heat between the measurement core and the jacket.

Thus, the measurement sensor 1 represented comprises:
- an outer jacket 11, being a fluid-tight jacket;
- a gas 12 contained in the jacket;
- a measurement core 16 incorporated in the jacket;
- a plurality of spacers 13 linking the core and the jacket and making it possible to hold, position, even centre, said core in said jacket;
- two temperature sensors: a first, "hot" temperature sensor 14 and a second, "cold" temperature sensor 15;
- connection wires 19A and 19B (between two and four) linked to the heating element of the measurement core.

The tight jacket makes it possible to contain and protect the various elements. Moreover, the jacket is adapted to be in direct contact with a heat-transfer fluid in order to discharge the thermal energy.

The jacket can notably be made of aluminium, of stainless steel or of titanium.

The jacket represented is of parallelepipedal form. The dimensions of the jacket are typically a few centimetres, for example a length of the order of three centimetres, a width of the order of two centimetres, and a depth of the order of one centimetre. The dimensions could however be reduced and vary more generally between a few millimetres and a few centimetres (typically less than or equal to three centimetres). The thickness of the walls of the jacket is, for example, half a millimetre.

Alternatively, the jacket can be of cylindrical form, a form more suited to most of the measurement channels in a nuclear reactor. In this case, the measurement core is preferably cylindrical or semicylindrical but a parallelepipedal form could be suitable. A cylindrical jacket can have a tapered end in order to enhance the flow of the heat-transfer fluid around the calorimetric sensor.

The sensitivity of the sensor can be adjusted by choosing the nature of the gas as a function of its thermal conductivity and therefore by acting on the thermal resistance of the gas blade. It can also make it possible to avoid oxidation in the sensor. The gas can be helium, dinitrogen, argon or xenon. The gas can be pressurized to a few tens of mbars compared to atmospheric pressure.

The first temperature sensor is closest to the centre of the measurement core and makes it possible to measure a temperature at a so-called "hot" point. The second temperature sensor is disposed on (or incorporated in) the jacket and makes it possible to measure a temperature at a so-called "cold" point. The temperature measurements at the hot and cold points make it possible to determine the nuclear heating.

The first sensor can be a thermocouple, for example of type K or N, whose diameter is preferably between 0.1 mm and 0.5 mm. The materials of the thermocouples can be: Chromel (Ni—Cr), Alumel (Ni—Al), Nicrosil (Ni—Cr—Si), Nisil (Ni—Si). The first sensor is the closest to the heating element, and it is preferably geometrically aligned with respect to the centre of the heating element. Alternatively, as indicated in the variant embodiment described above, the first sensor can be formed by the heating element which then forms a resistive temperature probe.

The second sensor can be a thermocouple, for example of type K or N, whose diameter is preferably between 0.1 mm and 0.5 mm. The materials of the thermocouples can be Chromel (Ni—Cr), Alumel (Ni—Al), Nicrosil (Ni—Cr—Si), Nisil (Ni—Si). The second sensor can be geometrically aligned with respect to the centre of the heating element, with temperature taken at the jacket, as represented. That can be on the inner face or on the outer face of the wall of the jacket.

Each temperature sensor is wired using a connector (not represented) to transfer the measurement from the measurement core to the central acquisition unit.

The temperature sensors can advantageously be microthermocouples, either wired microthermocouples, or thin-film microthermocouples. The diameter (wired thermocouple) or the thickness (thin-film microthermocouple) of such a sensor is of the order of a few micrometres at the measurement point. Connections with diameters similar to the conventional thermocouples are also necessary to be able to transfer the measurement from the measurement core to the central acquisition unit. The small bulk of the microthermocouples has the advantage of disturbing the measurement less by their lesser intrusivity, above all in the case where the dimensions of the measurement core are comparable to those of the temperature sensors. They are positioned in the same position as the conventional thermocouples: close to the heating element and close to the jacket.

The heating resistor is wired using wires (between two and four wires) 19A and 19B which pass through the jacket 11 and which are then linked to connectors to connect them to electrical power supplies and to a central acquisition unit.

The spacers can be in the form of cylindrical rods (with a diameter of 1 millimetre for example) and/or parallelepipedal.

Preferably, the spacers are made of a material identical to that of the samples, for example aluminium, stainless steel or titanium. Over and above their holding, positioning and/or centring function, the spacers are also configured to transfer the heat between the measurement core and the jacket. Thus they can have dimensions chosen to form a given thermal resistance and therefore be a parameter for adjusting the sensitivity of the sensor. Furthermore, spacers are sought whose thickness and dimensions make it possible not to add parasitic weight.

All or part of the spacers can be formed by lugs at the four corners of the samples through a holed form of the samples as illustrated in FIG. 3 and in FIG. 7 described below, and/or by spiked forms provided inside the jacket.

Second Embodiment (Calorimetric Sensor)

Figure 7:
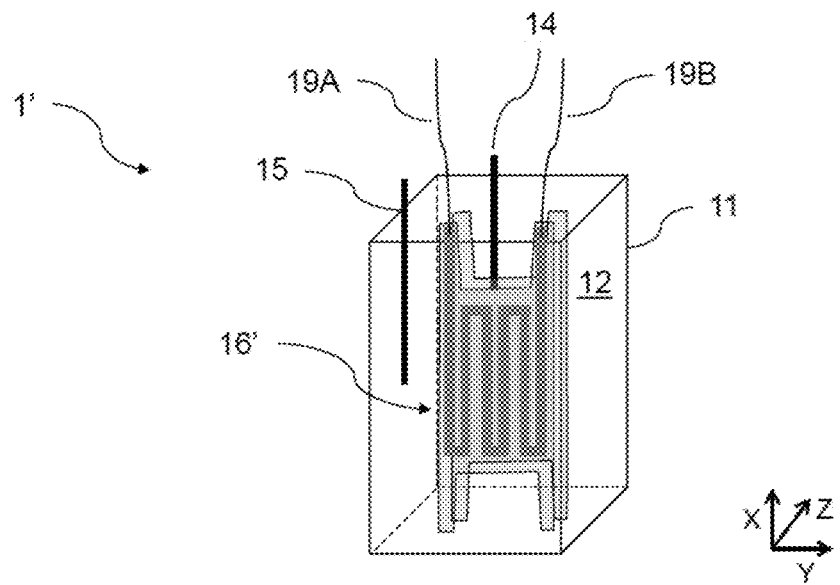
FIG. 7 represents a calorimetric sensor according to a second embodiment.

FIG. 7 represents a calorimetric sensor according to a second embodiment in which the measurement core has a holed form, like the measurement core 16' of FIG. 3.

The calorimetric sensor 1' represented does not comprise spacers, the measurement core 16' being held in the jacket 11 using the lugs of the two holed samples (eight lugs in all). In this case, the heat is conducted mostly longitudinally. Spacers can be added to transmit the heat transversely/radially and/or to centre the measurement core transversely/radially.

Alternatively, only an upper or lower portion of the samples is holed, for example the upper portion, and spacers can be added under the lower portion.

The different embodiments, variants and exemplary embodiments presented can be combined in all technically possible combinations.

Furthermore, the present invention is not limited to the embodiments previously described but extends to any embodiment that falls within the scope of the claims.

The invention claimed is:

1. A measurement core for measuring nuclear heating in a nuclear reactor, said core extending in a longitudinal direction (X) and having a main plane (XY), said measurement core comprising at least:
   a first sample formed by a first layer of material, the first sample being an element of material of known weight for which the nuclear heating is sought to be measured;
   a first thin layer of electrical insulation disposed on the first sample;
   a thin conductive layer forming a heating electrical resistor disposed on the first thin layer of electrical insulation; and
   a second thin layer of electrical insulation disposed on the heating electrical resistor;
   the first thin layer of electrical insulation having dimensions in the main plane matched to those of the first sample;
   the thin layers of electrical insulation being configured to insulate the heating electrical resistor from the first sample and protect said heating electrical resistor; and
   the first sample having dimensions less than or equal to around fifteen millimetres in the main plane, and/or a thickness less than or equal to 10 millimetres.

2. The measurement core according to claim 1, the heating electrical resistor comprising a track made of a conductive material in coil, spiral, or meander form.

3. The measurement core according to claim 1, the heating electrical resistor being made of platinum, of a nickel-chromium alloy, or of constantan.

4. The measurement core according to claim 1, the thin layers of electrical insulation being made of silicon oxide, of alumina, of silicon nitride, or of magnesium oxide.

5. The measurement core according to claim 1, the first sample being made of graphite, of stainless steel, of aluminium, or of titanium.

6. The measurement core according to claim 1, the first sample having a surface texture suitable for the deposition of at least one of the first thin layer of electrical insulation and the second thin layer of electrical insulation by a thin layer deposition technique.

7. The measurement core according to claim 1, further comprising at least one adhesion layer between the heating electrical resistor and at least one of the first thin layer of electrical insulation and the second thin layer of electrical insulation and/or between the first sample and at least one of the first thin layer of electrical insulation and the second thin layer of electrical insulation.

8. The measurement core according to claim 1, further comprising at least one functional layer that can be a layer of boron, of cadmium, of silicon carbide (SiC), and/or of lithium, said functional layer being able to be deposited on an outer face of the first sample.

9. The measurement core according to claim 1, the first sample being of parallelepipedal form, forming a parallelepipedal core.

10. The measurement core according to claim 1, the first sample being of semicylindrical form forming a semicylindrical or cylindrical core, having a cylinder length extending in the longitudinal direction (X).

11. The measurement core according to claim 1, the first sample being of disc form having a disc diameter extending in the longitudinal direction (X).

12. The measurement core according to claim 1, the heating electrical resistor being configured to form a resistive temperature probe so as to measure the temperature in a zone comprising a temperature measurement hot point, said heating electrical resistor being then linked to a measurement means of the resistor.

13. The measurement core according to claim 1, further comprising:
- a second sample formed by a second layer of material, the second sample being an element of material of known weight for which the nuclear heating is sought to be measured;
- the second thin layer of electrical insulation being between the heating electrical resistor and the second sample;
- the second thin layer of electrical insulation having dimensions in the main plane matched to those of the second sample;
- the second thin layer of electrical insulation being configured to insulate the heating electrical resistor from the second sample; and
- the second sample having dimensions less than or equal to around fifteen millimetres in the main plane, and/or a thickness less than or equal to 10 millimetres.

14. The measurement core according to claim 13, the first sample having a length (L1) and a diameter ($\Phi$1), and the second sample having a length (L2) and a diameter ($\Phi$2), wherein L1 is greater than L2, and wherein $\Phi$1 is greater than $\Phi$2.

15. The measurement core according to claim 1, the first sample being holed in at least one upper and/or lower portion so as to form at least two upper lugs and/or at least two lower lugs.

16. The measurement core according to claim 15, the upper lugs being dimensioned to accommodate connection elements of the heating electrical resistor, the upper lugs having a width greater than the lower lugs.

17. A calorimetric sensor for measuring nuclear heating in a nuclear reactor, said sensor comprising:
- a fluid-tight outer jacket;
- a gas contained in the outer jacket;
- a measurement core chosen according to claim 1, said core being disposed in the outer jacket;
- link means capable of holding the measurement core in the outer jacket and of transferring heat between the core and said jacket; and
- temperature measurement means, comprising a first temperature measurement means capable of measuring the temperature at a hot point as close as possible to a heating element of the measurement core, and a second temperature measurement means capable of measuring the temperature at a cold point on a wall of the jacket.

18. The calorimetric sensor according to claim 17, at least one of the first temperature measurement means and the second temperature measurement means comprising at least one thermocouple.

19. The calorimetric sensor according to claim 17, the heating electrical resistor being configured to form a resistive temperature probe so as to measure the temperature in a zone comprising the hot point, said heating electrical resistor being then linked to a measurement means of the resistor, the first temperature measurement means being formed by the heating electrical resistor.

20. The calorimetric sensor according to claim 17, the link means comprising spacers that can have different forms and materials.

21. The calorimetric sensor according to claim 17, the first sample being holed in at least an upper and/or lower portion so as to form at least two upper lugs and/or at least two lower lugs, the link means being wholly or partly formed by said lugs.

22. The calorimetric sensor according to claim 17, the jacket being made of aluminium, of stainless steel, or of titanium.

23. The calorimetric sensor according to claim 17, the jacket being of parallelepipedal form or of cylindrical form having a tapered end in order to enhance the flow of a heat-transfer fluid around the calorimetric sensor.

* * * * *